United States Patent [19]
Jones

[11] 4,285,357
[45] Aug. 25, 1981

[54] PNEUMATIC RELAY

[75] Inventor: Richard A. Jones, Bryn Mawr, Pa.

[73] Assignee: Fischer & Porter Co., Warminster, Pa.

[21] Appl. No.: 112,706

[22] Filed: Jan. 16, 1980

[51] Int. Cl.[3] ..................... G05D 16/00; F16K 31/365
[52] U.S. Cl. ......................................... 137/85; 137/84
[58] Field of Search .................. 137/85, 84, 86, 116.3, 137/116.5, 454.2

[56] References Cited

U.S. PATENT DOCUMENTS

| | | | |
|---|---|---|---|
| 2,825,354 | 3/1958 | Du Bois | 137/85 |
| 2,958,337 | 11/1960 | Holbrook | 137/85 X |
| 4,038,999 | 8/1977 | Hayashida | 137/116.3 |
| 4,171,004 | 10/1979 | Cerrato | 137/116.5 X |

*Primary Examiner*—Alan Cohan
*Attorney, Agent, or Firm*—Michael Ebert

[57] ABSTRACT

A pneumatic relay responsive to an air input signal whose pressure represents a variable, the relay producing an air output signal proportional thereto. The relay includes an input chamber to which the input signal is fed, this chamber being separated from an output chamber by a diaphragm of elastomeric material. Air from a constant high-pressure supply is fed into the output chamber through an adjustable supply port that is operatively coupled to the diaphragm to cause this port to open to an extent determined by the deflection of the diaphragm in response to the force produced by the pressure of air in the input chamber until a point is reached where the pressure developed in the output chamber attains equilibrium with that in the input chamber. When input signal pressure thereafter decreases to produce an imbalance in the pressures in the input and output chambers, the diaphragm is deflected in the reverse direction to cause an exhaust port mounted on the diaphragm to open and admit air from the output chamber into an elastomeric exhaust tube leading to the atmosphere until a point is reached where equilibrium is restored. The output signal is derived from the output port of the output chamber.

3 Claims, 6 Drawing Figures

Fig. 3.
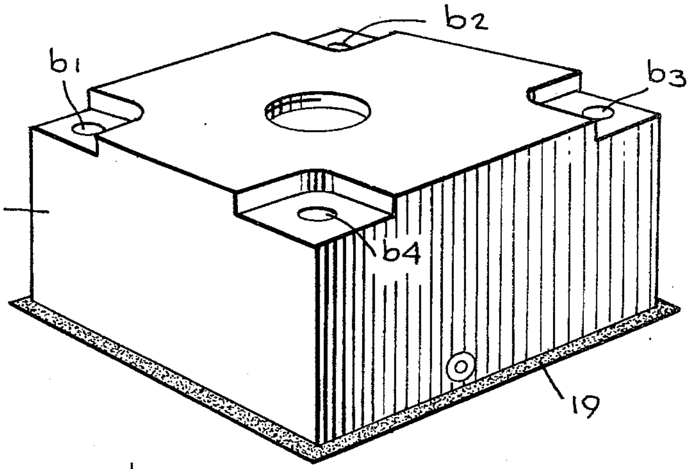
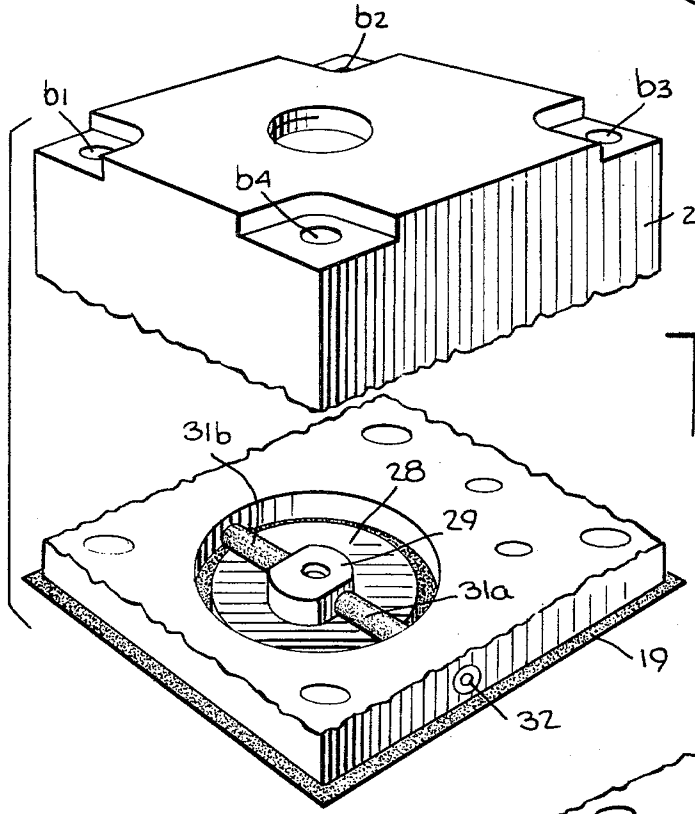
Fig. 4.
Fig. 6.
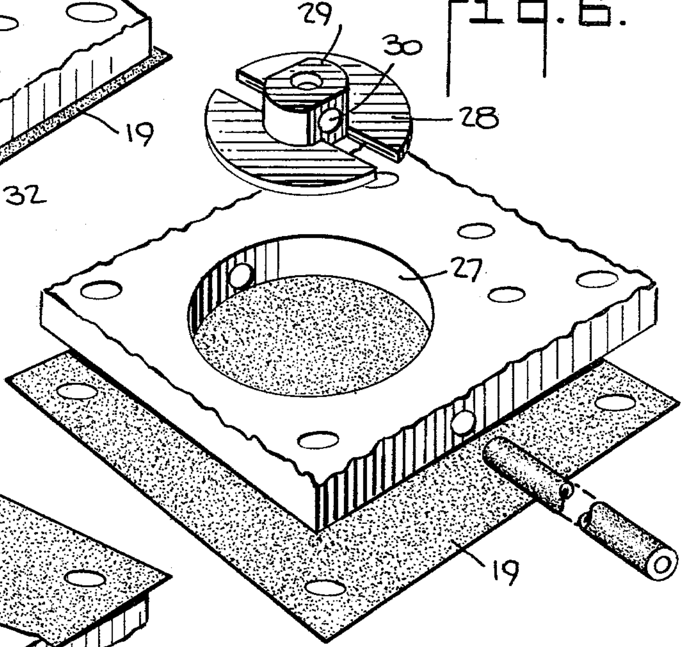
Fig. 5.
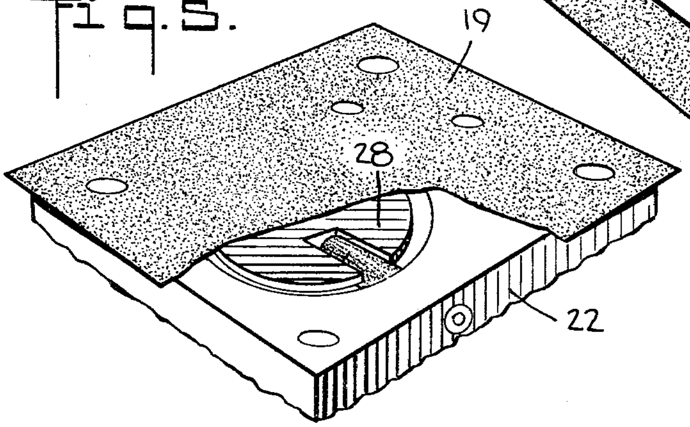

PNEUMATIC RELAY

BACKGROUND OF INVENTION

This invention relates generally to pneumatically-operated process control systems, and more particularly to an improved pneumatic relay for such systems.

The typical industrial process control system is operated by one or more final control elements, such as valves, adapted to govern the supply of fluid to the process. Where the final control element is a pneumatically-operated diaphragm type valve, it is known to actuate this valve by means of a pneumatic transmitter that is manually settable by an operator. This transmitter functions to transmit air to the final control element at a pressure level within a desired process control range, such as 3 to 15 PSIG. A manual transmitter of this type generally includes a pneumatic relay to increase the air handling capacity of the system.

In a conventional pneumatic relay for this purpose, two diaphragms are used, one of which covers an output chamber into which air from a constant pressure supply is fed through an adjustable supply port. The other diaphragm covers the input chamber into which is fed an input air signal representing the variable to be transmitted.

In a manual transmitter, this input signal is derived from an external fixed-volume chamber into which pressurized air is introduced under manual control so that the fixed volume chamber supplies an air input signal to the relay representing the variable to be transmitted—say, a signal having a pressure of 9 PSIG. If one wishes to change this air input signal to, say 5 PSIG, the fixed volume chamber is vented to the atmosphere until the internal pressure thereof is reduced to this level. In the relay, an exhaust chamber is defined between the two diaphragms. This exhaust chamber contains atmospheric air and a spacer to transmit the force between the output and input chambers, the spacer containing a relay exhaust port.

The deflection of the diaphragms, in response to air pressure in the input chamber, acts to open the supply port to feed air from the constant pressure supply into the output chamber until the pressure therein is in equilibrium with the pressure in the input chamber, at which point the pressure of the air output signal yielded in the output port is proportional to the input signal. A subsequent change in the air input signal resulting in a corresponding change in pressure in the input chamber produces a pressure differential across the diaphragms between the input and output change to cause the relay exhaust port to open to reduce the pressure in the output chamber until equilibrium is restored.

The practical difficulty with a conventional double diaphragm relay of the above-described type is that the diaphragm is not completely impermeable to the flow of air therethrough; for existing diaphragm materials suitable for pneumatic relays, such as neoprene, possess some degree of permeability to air, the extent of molecular air flow through the diaphragm wall depending on the pressure difference thereacross. This air leakage through the diaphragm results in a reduction of pressure within the input chamber which is supplied by a fixed volume external to the relay, thereby impairing the maintenance of the desired output air signal.

SUMMARY OF INVENTION

In view of the foregoing, the main object of this invention is to provide an improved pneumatic relay of the single diaphragm type for use in a pneumatic, manually-controlled transmitter or in any other context in which it is necessary to minimize leakage through the diaphragm.

More particularly, it is an object of this invention to provide a pneumatic relay having a slightly permeable elastomeric diaphragm which reduces the flow of air through the diaphragm to an extent satisfying the operating requirements of the relay.

Also an object of the invention is to provide a relay which can be produced at relatively low cost and which operates reliably and efficiently.

Briefly stated, these objects are attained in a pneumatic relay responsive to an air input signal whose pressure represents a variable to produce an air output signal proportional to the input signal. The relay includes a block divided into an input chamber, a supply chamber and an output chamber interposed between the input and supply chambers. The supply and output chambers are separated by a wall having a first valve seat therein, and the output and input chambers are separated by a single diaphragm of elastomeric material slightly permeable to air and having a second valve seat secured thereto in registration with the first seat.

Extending between the valve seats is the stem of a double-ended poppet valve having a first valve member engaging the first seat to form therewith an adjustable supply port, and a second valve member engaging the second valve seat to form an adjustable exhaust port therewith. Air from a constant pressure supply is fed into the supply chamber. The air input signal is fed into the input chamber and the air output signal is taken from the output chamber.

When the single diaphragm is deflected by a force resulting from the pressure developed in an input chamber by the input signal, the poppet valve is axially displaced to open the supply port to admit air into the output chamber from the supply chamber to an extent determined by the input signal until the pressure therein is in equilibrium with the input chamber pressure.

A subsequent fall in input pressure produces an imbalance in the pressures with a resultant deflection of the diaphragm in the reverse direction to cause the second valve member to disengage from the second seat to exhaust air from the output chamber until equilibrium is restored. Because the second valve member is subjected to atmopheric pressure, the pressure differential across the diaphragm is lowered, thereby reducing molecular air flow through the diaphragm between the input and output chambers.

OUTLINE OF DRAWINGS

For a better understanding of the invention as well as other objects and further features thereof, reference is made to the following detailed description to be read in conjunction with the accompanying drawings, wherein:

FIG. 3 is a perspective of the relay body;

FIG. 4 shows the block broken into two sections to expose the diaphragm valve seat;

FIG. 5 shows the block as seen from the diaphragm; and

FIG. 6 is an exploded view of the lower section broken off the block, the diaphragm and the exhaust tube.

DESCRIPTION OF INVENTION

Figure 1:
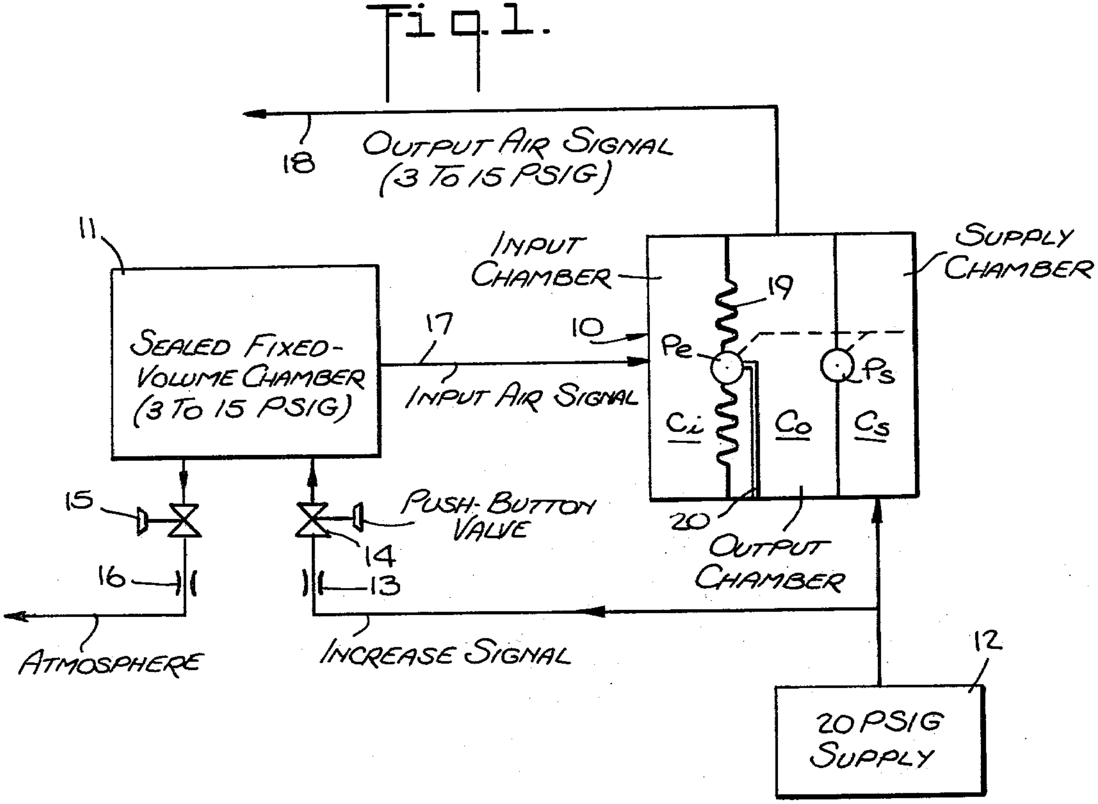
FIG. 1 is a block diagram of a manual pneumatic transmitter which includes a pneumatic relay in accordance with the invention.
Figure 2:
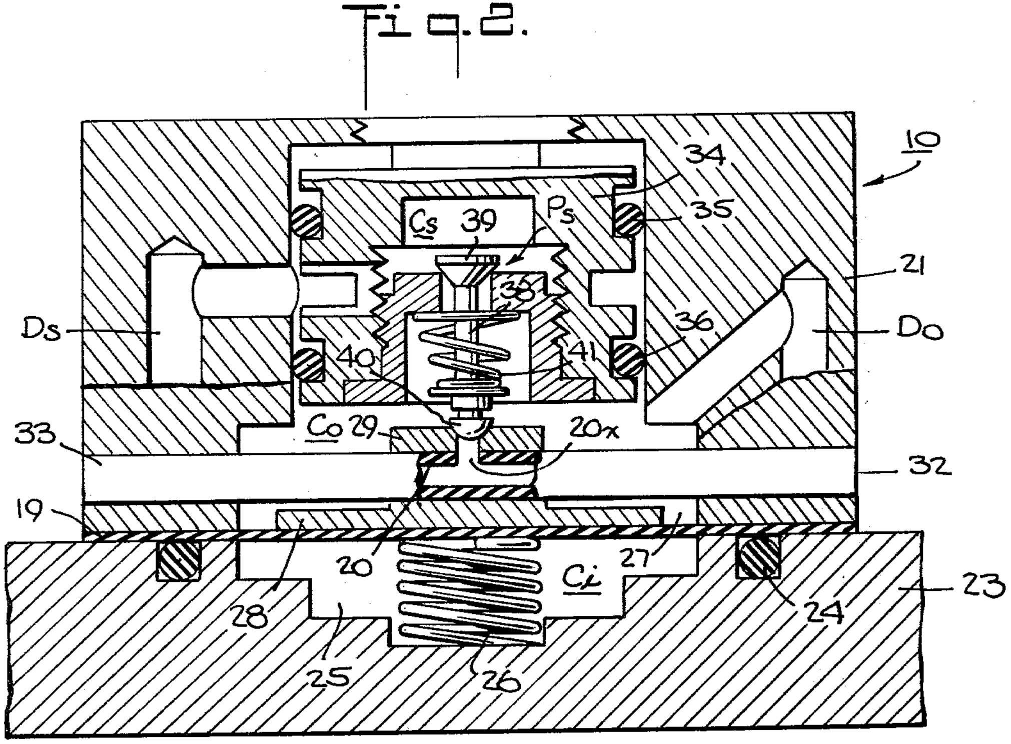
FIG. 2 is a section taken through the relay structure.

Referring now to FIG. 1, there is schematically shown a manual transmitter including a relay 10 in accordance with the invention, the relay operating in conjunction with an external sealed fixed-volume chamber 11 and a constant pressure air supply 12 (20 PSIG). Air from constant pressure supply 12 is fed into fixed volume chamber 11 through a restriction 13 in series with a push-button valve 14 so that by manually operating valve 14, one can build up pressure with this chamber to a level within a desired process control range, such as 3 to 15 PSIG.

To reduce pressure in the fixed-volume chamber 11, the chamber is vented to the atmosphere through a second push button valve 15 in series with a restriction 16. This fixed-volume chamber supplies an input air signal through an output line 17 to relay 10 which yields in its output line 18 an output signal whose pressure is proportional to the input air signal.

Relay 10 is divided by a diaphragm 19 and a wall into an input chamber $C_i$, an output chamber $C_o$ and a supply chamber $C_s$.

An input air signal from fixed-volume chamber 11 is fed into input chamber $C_i$ of the relay. Air from the constant pressure supply 12 is fed into supply chamber $C_s$. Supply chamber $C_s$ is coupled to output chamber $C_o$ through an adjustable supply port $P_s$ which opens to an extent determined by the deflection of diaphragm 19 in response to the air input signal from fixed-volume chamber 11.

Pressure builds up in output chamber $C_o$ until the pressure exerted on the inner face of diaphragm 19 is in equilibrium with the input pressure in input chamber $C_i$ applied to the outer face of the diaphragm..

When the input pressure signal decreases from a given value to reduce the deflection of diaphragm 19, because of the resultant imbalance in the pressures of the input and output chambers this causes an exhaust port $P_e$ to open to provide an exhaust passage through a tube 20 leading to the exterior of the relay and to the atmosphere to reduce the pressure in output chamber $C_o$ until equilibrium is restored at the new input pressure value, at which point the exhaust port is closed.

The Relay:

Referring now to FIGS. 2 to 6, there is shown the structure of an actual embodiment of the single diaphragm relay 10 in accordance with the invention. The body of the relay structure consists of a block 21 of stainless steel or similar material, the block being bolted at all four corners through bores $b_1$, $b_2$, $b_3$ and $b_4$ to a plate 23. Diaphragm 19, formed by a thin sheet of elastomeric material, is sandwiched between relay body 21 and plate 23. The undersurface of diaphragm 19 is engaged by a compressible "0" ring 24 accommodated in an annular channel formed in plate 23 to afford a seal between the relay body and plate.

Also formed in plate 23 is a circular well 25 having a stepped formation, the well defining input chamber $C_i$ of the relay, this chamber being enclosed by the outer face of diaphragm 19. Relay body 21 is provided with a circular bore 27 which registers with the uppermost step of well 25. Lying within bore 27 and bonded to diaphragm 19 is a disc 28 having a central hub which forms the valve seat 29 of exhaust port $P_e$.

Valve seat 29 is provided with a transverse bore through which extends elastomeric tube 20 having an opening $20_x$ therein communicating with a valve seat 29. One portion 20a of the tube extends through minor body section 22 to an exhaust outlet 32, the opposing portion 20b of the tube extending in the opposite direction to an exhaust outlet 33. A helical spring 26 seated in the lowermost step of well 25 in input chamber $C_i$ applies a bias pressure to valve seat 29.

The relay body is provided with a central bore within which is received a spool 34, "0" rings 35 and 36 serving to seal the spool within this bore. The space between the front end of spool 34 and the inner face of diaphragm 19 defines the output chamber $C_o$. A duct $D_o$, which couples output chamber $C_o$ to the relay output line, is bored in the relay body.

Threadably received within spool 34 is a cylindrical hat 37 whose top defines the valve seat of supply port $P_2$. The space between the upper end of hat 37 and the rear end of spool 34 defines supply chamber $C_s$, this chamber being coupled by a duct $D_s$ to the constant pressure supply 12, as shown in FIG. 1. Coaxially disposed within hat 37 is a double-ended poppet valve formed by a stem 38 and valve elements 39 and 40 at either end thereof, stem 38 being encircled by a helical spring 41. Valve element 40 engages valve seat 29 of exhaust port $P_e$, while valve element 39 engages valve seat 37 of supply port $P_s$.

Input chamber $C_i$ communicates with the external fixed volume chamber 11, as shown in FIG. 1; hence the pressure within input chamber $C_i$ reflects the input air signal pressure. The extent to which diaphragm 19 is deflected depends on the input signal, the deflection of the diaphragm causing poppet stem 38 whose valve element 40 rests on valve seat 29 to move upwardly and to raise valve element 39 above valve seat 37 of supply port $P_s$. Supply port $P_s$ is therefore caused to open to a degree determined by the input signal to admit air from the air pressure supply into output chamber $C_o$.

Pressure builds up in output chamber $C_o$ until the pressure exerted on the inner face of diaphragm 19 is in equilibrium with the input pressure in input chamber $C_i$ applied to the outer face of the diaphragm. The resultant output pressure in output chamber $C_o$ is applied through output duct $D_o$ to the output line to transmit this signal to a final control element in a process control system.

When the input pressure signal decreases from a given level, this acts to reduce the deflection of diaphragm 19. Because of the imbalance which then results between the input pressure signal in input chamber $C_i$ and the existing pressure in output chamber $C_o$, valve seat 29 is caused to disengage from valve element 40, thereby opening exhaust port $P_e$ to provide an exhaust passage through elastomeric tube 20 leading to atmospheric exhaust outlets 32 and 33 at the exterior of the relay body. Output chamber $C_o$ continues to exhaust in this manner until equilibrium is restored at the new pressure level, at which point exhaust port $P_e$ is closed.

Because the valve seat of the exhaust port is subjected to atmospheric pressure, the pressure differential across the diaphragm is lowered, thereby reducing molecular air flow through the diaphragm between the input and output chambers. This relay arrangement also has the advantage of eliminating the gain caused by changes in effective diaphragm area with vertical displacement.

While there has been shown and described a preferred embodiment of a pneumatic relay in accordance with the invention, it will be appreciated that many changes and modifications may be made therein without, however, departing from the essential spirit thereof.

I claim:

1. A pneumatic relay responsive to an air input signal whose pressure represents a variable to produce an air output signal proportional thereto, said relay comprising:

A. a structure defining an input chamber, an output chamber and a supply chamber;

B. an elastomeric diaphragm interposed between the input and output chambers, said structure being constituted by a meter body provided with a central bore which is secured to a plate having a well formed therein to define said input chamber, said diaphragm being sandwiched between said plate and said body, whereby said outer face seals said input chamber and said inner face seals the output chamber which is defined in said bore, said bore being internally divided to further define said supply chamber;

C. a supply port interposed between the output and supply chambers, said supply port having a valve seat and being operatively coupled to said diaphragm;

D. means to feed air from a constant pressure source to said supply chamber;

E. means to feed said input signal into said input chamber to deflect said diaphragm in one direction to cause said supply port to open to admit air from said supply chamber into said output chamber until the pressure in the output chamber is in equilibrium with the pressure in the input chamber;

F. an exhaust port provided with a valve seat defined in the raised hub of a disc disposed centrally in said output chamber and bonded to the inner face of said diaphragm, said exhaust port valve seat being coupled by an open-ended elastomeric tube passing through a lateral passage in said hub to the atmosphere at opposing sides of the meter body, whereby when there is a change in input signal pressure resulting in an imbalance between said output pressure and the input pressure, the resultant diaphragm deflection in the reverse direction causes opening of the exhaust port to discharge air from the output chamber until equilibrium is restored;

G. a helical spring disposed in a well in said plate, the upper end of the spring engaging the inner face of the diaphragm to apply a bias to said disc; and H. means to derive said output signal from said output chamber.

2. A relay as set forth in claim 1, wherein said bore is divided by a spool received therein, the space between the front of the spool and the inner face of the diaphragm defining the output chamber, said spool having a cylindrical insert socketed therein whose top defines the valve seat of the supply port, the space between said top and the rear end of the spool defining the supply chamber.

3. A relay as set forth in claim 1, further including a poppet stem provided with valve elements at either end thereof, one element cooperating with the valve seat of the supply port, the other element cooperating with the valve seat of the exhaust port whereby when the diaphragm is deflected in said one direction, the one element is raised relative to the supply port valve seat to open the supply port and when the diaphragm is deflected in the reverse direction, the exhaust port valve seat is displaced with respect to the other element to open the exhaust port.

* * * * *